United States Patent [19]

Iwasaki et al.

[11] Patent Number: 5,078,984

[45] Date of Patent: Jan. 7, 1992

[54] PROCESS FOR PRODUCING MICROCRYSTALLINE BARIUM FERRITE PLATELETS

[75] Inventors: Susumu Iwasaki; Shigefumi Kamisaka; Yoshihiko Nakane; Iwao Yamazaki; Tutomu Hatanaka, all of Sakai, Japan

[73] Assignee: Sakai Chemical Industry Co., Ltd., Osaka, Japan

[21] Appl. No.: 358,614

[22] Filed: May 30, 1989

[30] Foreign Application Priority Data

Jun. 1, 1988 [JP] Japan ................................ 63-136214

[51] Int. Cl.$^5$ ...................... C01G 49/00; C04B 35/26; C04B 35/64
[52] U.S. Cl. ................................ 423/594; 252/62.63; 252/62.62; 252/62.6; 252/62.56; 252/62.59; 252/62.58
[58] Field of Search ................. 252/62.63, 62.62, 62.6, 252/62.56, 62.58, 62.59; 423/594

[56] References Cited

U.S. PATENT DOCUMENTS

| | | | |
|---|---|---|---|
| 4,401,643 | 8/1983 | Hibst | 423/594 |
| 4,414,124 | 11/1983 | Endo | 423/594 |
| 4,664,831 | 5/1987 | Hibst | 423/594 |

FOREIGN PATENT DOCUMENTS 3729693 5/1988 Fed. Rep. of Germany .
62-275027 11/1987 Japan .

*Primary Examiner*—Michael Lewis
*Assistant Examiner*—Steven Bos
*Attorney, Agent, or Firm*—Wenderoth, Lind & Ponack

[57] ABSTRACT

A process for producing microcrystalline barium ferrite platelets which comprises: forming an aqueous alkaline dispersion containing coprecipitates of hydroxides of barium ions, iron (III) ions, and optionally ions of a substituent element; heating the dispersion to a temperature of not less than 50° C. and not more than the boiling point of the dispersion under an atmospheric pressure to convert the coprecipitates to precursors of the barium ferrite; calcining the precursors to provide microcrystalline barium ferrite platelets; the improvement comprising the step of adding a carbonating agent such as sodium carbonate to the aqueous alkaline dispersion before or after the heating of the aqueous dispersion to insolubilize water soluble barium ions therein, and the step of calcining the barium ferrite precursors in the presnece of sodium sulfate at temperatures of 700°-900° C., to provide microcrystalline barium ferrite platelets of about 0.03-0.1 μm in average particle size and 2-5 in planarity ratio.

8 Claims, No Drawings

PROCESS FOR PRODUCING MICROCRYSTALLINE BARIUM FERRITE PLATELETS

The present invention relates to a process for producing microcrystalline barium ferrite plateletes of about 0.03-0.1 μm in average particle size, 2-5 in planarity ratio and of high dispersibility in the organic phase.

Typical barium ferrites, as represented by BaO.6-Fe$_2$O$_3$, have a coercive force usually of 3000-6000 Oe, but so-called metal-substituted hexagonal platelet barium ferrite wherein cobalt or titanium, for example, has been substituted in part for the iron has a coercive force of 200-2000 Oe suitable for high performance magnetic recording media, depending upon the nature of the substituent metals and the degree of the substitution of iron by the metals.

Heretofore much efforts have been made to put high performance magnetic recording media, in particular, perpendicular magnetic recording media, to practical use, and coating type magnetic recording media, produced by coating a finely divided powder of substituted barium ferrite platelets dispersed in organic binders on a substrate film, represent the most promising media from the standpoint of productivity and production cost.

Barium ferrites as the coating type magnetic recording media are required to have easy magnetization axis perpendicular to the plane of the recording media and such a suitable coercive force as above mentioned, but also should possess a large saturation magnetization, a small particle size and a narrow particle size distribution. In addition, it is required that the barium ferrites are capable of being contained in a coating in high orientation and large proportions.

To meet these requisites there is disclosed in Japanese Patent Laid-open No. 62-275027 a method of producing barium ferrite powder in which an alkali is added to an aqueous solution which contains ion species in amounts conforming with the barium ferrites to be formed, to first produce coprecipitates, followed by subjecting the aqueous dispersion of the coprecipitates to hydrothermal reaction to provide precursors of barium ferrite, treating the thus-produced precursors with inorganic silicates, sodium sulfate or inorganic halides, and then calcining the thus treated precursors. However, this method includes a hydrothermal reaction, so that it requires much plant expense and a high production cost, but also the resultant barium ferrite has been found to be still large in planarity ratio, and insufficient in dispersibility in organic coatings for use in high performance magnetic recording media.

Therefore, a further method is disclosed in Japanese Patent Laid-open No. 62-207720, wherein an alkali is added to an aqueous solution which contains the ion species to form coprecipitates, the coprecipitates are treated with sodium chloride or barium chloride without subjecting the coprecipitates to hydrothermal reaction, and then the coprecipitates are calcined. It is described therein that barium ferrite powder of not more than 0.1 μm in average particle size and of not more than 5 in planarity ratio is obtained, but it has been found that the powder has a wide particle size distribution, and is still insufficient in dispersibility in organic coatings and magnetic recording properties.

It is, therefore, an object of the invention to provide a process for producing microcrystalline barium ferrite platelets which are narrower in particle size distribution and much improved in dispersibility in organic coatings than the prior barium ferrites, to make it possible to produce high performance recording media of a higher level of output and a lower level of noise.

According to the invention, there is provided a process for producing microcrystalline barium ferrite platelets having a general formula:

$$BaO\cdot n[(Fe_{1-m}M_m)_2O_3]$$

wherein M is at least one substituent element selected from the group consisting of Co, Ti, Ni, Mn, Cu, Zn, In, Ge and Nb, m is 0-0.2, and n is 4-6, which comprises:

forming an aqueous alkaline dispersion containing coprecipitates of hydroxides of barium ions, iron (III) ions, and optionally ions of a substituent element M, in a molar ratio in conformity with the general formula of the barium ferrite, and which has a pH of not less than about 12;

heating the dispersion to a temperature of not less than 50° C. and not more than the boiling point of the dispersion under an atmospheric pressure to convert the coprecipitates to precursors of the barium ferrite;

calcining the precursors to provide microcrystalline barium ferrite platelets;

the improvement comprising the step of adding a carbonating agent selected from the group consisting of water soluble alkali metal carbonates, ammonium carbonate and carbon dioxide gas to the aqueous alkaline dispersion before or after the heating of the aqueous alkaline dispersion, and the step of calcining the precursors of the barium ferrite in the presence of sodium sulfate at temperatures of 700°-900° C., to provide microcrystalline barium ferrite platelets of about 0.03-0.1 μm in average particle size and 2-5 in planarity ratio.

In the specification, the particle size is defined as the length of the longest diagonals on the hexagonal platelets, and the planarity ratio is defined as the ratio of the particle size to the thickness of the particles.

According to the process of the invention, an aqueous alkali is first added to an aqueous solution which contains barium ions, iron (III) ions, and optionally ions of a substituent element M, in a molar ratio in conformity with the aforesaid general formula, to prepare an aqueous dispersion which contains coprecipitates of the hydroxides of the above ion species and has a pH of not less than 12. The aqueous dispersion is then heated at temperatures of not less than 50° C. but not more than the boiling point of the dispersion under atmospheric pressure, to provide precursors of barium ferrite.

When the dispersion is heated at temperatures of less than 50° C., the precursors are insufficiently formed, and such precursors are readily sintered when being calcined. However, when the dispersion is heated at temperatures of more than the boiling temperature under an increased pressure, the precursors grow excessively to form large particles of more than 0.1 μm in particle size. Occasionally, the resultant particles are also of more than 5 in planarity ratio. Preferably the dispersion is heated at temperatures of 50°-90° C., most preferably at temperatures of 60°-80° C.

In the aforesaid general formula, M is at least one substituent element selected from the group consisting of Co, Ti, Ni, Mn, Cu, Zn, In, Ge and Nb, among which are preferred at least one of Co, Ni, Zn and Ti from the standpoint of the saturation magnetization of the resultant microcrystalline barium ferrite platelets.

It is necessary that the barium ions, iron (III) ions, and ions of substituent elements M, are used in a molar ratio in conformity with the aforesaid general formula in the preparation of an aqueous solution of the ions. If the value either of n or m in the formula is other than that specified, there is not obtained the microcrystalline barium ferrite platelets as described above. In particular, when the barium ferrite particles have a planarity ratio of less than 2, they have poor orientation in organic coatings on substrates of recording media, and when more than 5, they have poor dispersibility in organic coatings.

The aqueous solution may be prepared by dissolving water soluble compounds of the ions into water. The water soluble compounds of barium, iron (III) and substituent elements usable include, for example, nitrates such as barium nitrate, ferric nitrate, cobaltous nitrate, titanium nitrate, nickel nitrate, manganese nitrate, cupric nitrate, zinc nitrate, indium nitrate, germanium nitrate and niobium nitrate; perchlorates such as barium perchlorate, ferric perchlorate, cobalt perchlorate, titanium perchlorate, nickel perchlorate, manganese perchlorate, copper perchlorate, zinc perchlorate and indium perchlorate; chlorates such as barium chlorate, ferric chlorate, cobaltous chlorate, nickel chlorate, cupric chlorate and zinc chlorate; chlorides such as barium chloride, ferric chloride, cobaltous chloride, titanium chloride, nickel chloride, cupric chloride, manganese chloride, zinc chloride and indium chloride; fluorides such as ferric fluoride, cobaltous fluoride, titanium fluoride, cupric fluoride, germanium fluoride and niobium fluoride; acetates such as barium acetate, ferric acetate, cobaltous acetate, nickel acetate, manganese acetate and zinc acetate; and sulfates such as cobaltous sulfate, titanium sulfate, nickel sulfate, manganese sulfate, zinc sulfate and indium sulfate.

It is necessary that the aqueous alkaline dispersion, which contains coprecipitates of hydroxides of the ion species, have a pH of not less than 12. When the dispersion has a pH of less than 12, it is difficult to obtain barium ferrite powder of not more than 0.1 $\mu$m in particle size. It is particularly preferred that the dispersion have a pH of not less than 13. There may be preferably used strong alkalis such as sodium hydroxide, potassium hydroxide or lithium hydroxide to make the dispersion alkaline.

In accordance with the invention, a carbonating agent is added to the aqueous alkaline dispersion before or after the aqueous alkaline dispersion is heated to produce barium ferrite precursors. Preferably, the carbonating agent is added to the aqueous alkaline dispersion after the heating of the aqueous alkaline dispersion. The carbonating agent is selected from the group consisting of a water soluble alkali metal carbonate, ammonium carbonate and carbon dioxide gas. For instance, sodium carbonate or potassium carbonate is preferably used. The carbonating agent may be used in amounts ranging from one hundredth of the equivalent of the barium ions to amounts representing the same equivalent as barium ions, and usually about half the equivalent is used.

The barium ferrite precursor produced by heating the aqueous dispersion of the coprecipitates has the aforesaid general formula, but is found amorphous from the standpoint of X-ray diffraction. Therefore, the precursors have a small saturation magnetization and coercive force, so that they can not be used as a material for practical high performance magnetic recording media.

It has been found that portions of the barium ions of the coprecipitates and barium ferrite precursors remain water soluble in the dispersion. Therefore, when the coprecipitates or barium ferrite precursors are filtered thereafter, or washed with water, the water soluble barium ions dissolve out therefrom, to make the compositions thereof locally nonuniform. The resultant barium ferrites have a large particle size, and are nonuniform in particle size and particle size distribution. In addition, such barium ferrites have no planarity ratio of 2-5.

However, according to the invention, the carbonation agent is added before or after the heating of the aqueous alkaline dispersion of the coprecipitates to make the water soluble barium ions water insoluble as carbonates, so that there are obtained barium ferrite particles which have uniform compositions, small planarity ratios and narrow particle size distributions, making it possible to produce barium ferrite powder improved in magnetic recording properties.

Further in accordance with the invention, water soluble silicates may be present together with the carbonation agents before or after the heating of the aqueous alkaline dispersion of the coprecipitates to form barium ferrite precursors. The water soluble silicates usable include, for instance, silicates of alkali metals, such as sodium silicate or potassium silicate. The silicates are used in amounts of about not more than 3% by weight as silica ($SiO_2$) based on the theoretical yield of barium ferrite.

The barium ferrite precursors are then clacined together with sodium sulfate at temperatures of 700°-900° C., to complete the crystallization of the precursors to hexagonal crystals, and at the same time, to well-defined platelets, thereby to produce microcrystalline barium ferrite platelet powder. More specifically, the sodium sulfate prevents the sintering of the barium ferrite precursors to each other during the completion of crystallization of the precursors to hexagonal platelets. Then, the resultant calcined products are washed with water to remove the sodium sulfate by dissolving it in water, to provide microcrystalline barium ferrite hexagonal platelets of 0.03-0.1 $\mu$m in average particle size and of 2-5 in planarity ratio.

In other words, according to the process of the invention, the sodium sulfate separates the particles of the precursors from each other and dilutes the particles so as to prevent the sintering of the particles to each other, but also acts as calcination assistants so that the precursors grow to well-defined hexagonal platelets. As a result, the individual precursors complete the crystallization substantially independently from the other particles, to provide microcrystalline, well-defined hexagonal platelets of barium ferrite.

The sodium sulfate is used in amounts of not less than about 50 parts by weight in relation to 100 parts by weight of the barium ferrite precursors. When the sodium sulfate is used in amounts of less than about 50 parts by weight in relation to 100 parts by weight of the precursors, the sodium sulfate dilutes the precursors only insufficiently so that the precursors sinter together to form large particles when being calcined. On the other hand, as is previously mentioned, since the sodium sulfate is removed from the calcined products by washing with water after the calcination, sodium sulfate may be used in amounts which are in a large excess of that of the precursors. However, the use of such a large excess amount of sodium sulfate requires a great deal of time to remove it from the calcined product and also no special merits are expected from the use of such large amounts. Therefore, the amount of sodium sulfate is preferably in the range of about 100-200 parts by weight in relation to 100 parts by weight of the precursors.

The precursors may be dry-mixed or wet-mixed with sodium sulfate, if necessary dried, granulated or powdered, and then the mixture is heated in an electric oven, however, the method of mixing and calcining is not restricted to any specific one.

The calcining temperature is preferably in the range of about 700°-900° C. When the calcining temperature is less than about 700° C., the crystallization of the precursors is so insufficient as to provide barium ferrite powder which is still unsatisfactory in magnetic properties, whereas when the calcining temperature is more than about 900° C., the barium ferrite precursors are apt to sinter together in part in the calcination even in the presence of sodium sulfate. Thus, large particles of more than 0.1 μm in particle size are occasionally produced, which are not suitable for use as a high performance magnetic recording material.

More preferably, the calcining temperature is not less than about 800° C. but less than the melting point of sodium sulfate, i.e., 884° C. Namely, the calcination is preferably carried out in solid phase of sodium sulfate. When the calcining temperature is less than about 800° C., the resultant barium ferrite has a tendency to have a small saturation magnetization, whereas when the calcining temperature is more than the melting point of sodium sulfate, namely, when the calcination is carried out in the liquid phase of the sodium sulfate, the resultant barium ferrite has a tendency to have a large particle size, but also a wider particle size distribution.

As above set forth, in accordance with the process of the invention, microcrystalline barium ferrite hexagonal platelets of 0.03-0.1 μm in average particle size, 2-5 in planarity ratio and narrow particle size distribution are produced. These microcrystalline barium ferrite hexagonal platelets are highly dispersible in organic coatings, and thus successfully provide high performance magnetic recording media of a high level of output and a low level of noise.

The invention will now be described with reference to examples, however, the invention is not limited thereto.

EXAMPLE 1

An amount of 205.6 ml of a 3.0 mole/l aqueous solution of ferric chlorided, 60 ml of a 1.0 mole/l aqueous solution of barium chloride, 51.6 ml of a 1.0 mole/l aqueous solution of cobalt chloride and 51.6 ml of a 1.0 mole/l aqueous solution of titanium tetrachloride were mixed together. The resultant solution was added to 1146 ml of a 15 mole/l aqueous solution of sodium hydroxide at 15°-20° C., to provide an aqueous dispersion having a pH of 14 and containing coprecipitates of hydroxides of Fe, Ba, Co an Ti. The dispersion was then heated at 60° C. for 4 hours under stirring.

Then an amount of 3.18 g of sodium carbonate was added to the dispersion and the mixture was stirred for 30 minutes to insolubilize the water soluble barium ions, and thereafter, the dispersion was filtered and washed with water, to provide barium ferrite precursors represented by the formula of $BaO \cdot (Fe_{10.28}Co_{0.86}Ti_{0.86}O_{18})$.

The barium ferrite precursors were then mixed with an equal amount in weight of sodium sulfate in a mortar, granulated into granules of about 3 mm in diameter and dried.

The precursors were then calcined at 850° C. in an electric oven for 3 hours, crushed, and further wet-powdered with a sand-grinder. Then the finely divided powder was washed with water to remove sodium sulfate therefrom, filtered, and dried, to provide microcrystalline barium ferrite powder.

The saturation magnetization ($\sigma$s) and the coercive force (iHc) of the barium ferrite powder were measured with a vibration magnetometer. Average particle size, average thickness and particle size distribution were measured through the electron microphotographs of the powder. Planarity ratio was determined based on the average particle size and average thickness of the particles. The results are shown in the Table 1.

EXAMPLES 2 and 3

In the production of the aqueous dispersion of the coprecipitates in the Example 1, barium chloride was used in varied amounts to vary ratios of Ba/(Fe+Co+Ti), as shown in the Table 1, and otherwise in the same manner as in the Example 1, barium ferrite powders were prepared. The properties of the powders are shown in the Table 1.

REFERENCE EXAMPLES 1-5

The barium ferrite precursors were not treated with sodium carbonate, and sodium sulafate or barium chloride was or was not used as a calcining assistant, as shown in the Table 1, and otherwise in the same manner as in the Example 1, barium ferrite powders were prepared. The properties of the powders are shown in the Table 1.

REFERENCE EXAMPLE 6

In the production of the aqueous dispersion of the coprecipitates in the Example 1, barium chloride was used so that coprecipitates of hydroxides had a ratio of Ba/(Fe+Co+Ti) of 1.3/12 and the dispersion of the coprecipitates was heated at 200° C. for 4 hours under an increased pressure, and otherwise in the same manner as in the Example 1, barium ferrite powders were prepared. The properties of the powders are shown in the Table 1.

TABLE 1

| | Production Conditions | | Properties of Barium Ferrite | | | | | |
|---|---|---|---|---|---|---|---|---|
| | Ba/(Fe + Co + Ti) Molar Ratio | Calcining Assistant | $\sigma$s (emu/g) | iHc (Oe) | Specific Surface Area ($m^2$/g) | Average Particle Size A (μm) | Average Particle Thickness B (μm) | Planarity Ratio (A/B) | Particle Size Distribution (μm) |
| Example 1 | 1.0/12 | $Na_2SO_4$ | 58.9 | 520 | 33.0 | 0.070 | 0.015 | 4.6 | 0.050~0.120 |
| 2 | 1.2/12 | $Na_2SO_4$ | 56.5 | 670 | 38.8 | 0.055 | 0.014 | 3.9 | 0.035~0.090 |
| 3 | 1.3/12 | $Na_2SO_4$ | 55.1 | 608 | 38.0 | 0.050 | 0.015 | 3.3 | 0.030~0.090 |
| Reference 1 | 1.0/12 | $Na_2SO_4$ | 58.6 | 571 | 22.8 | 0.110 | 0.017 | 6.5 | 0.045~0.160 |
| 2 | 1.2/12 | $Na_2SO_4$ | 56.0 | 685 | 22.6 | 0.100 | 0.016 | 6.3 | 0.040~0.150 |
| 3 | 1.3/12 | $Na_2SO_4$ | 55.2 | 650 | 25.6 | 0.885 | 0.015 | 5.9 | 0.035~0.145 |
| 4 | 1.3/12 | (none) | 54.8 | 908 | 23.1 | 0.105 | 0.016 | 6.6 | 0.020~0.170 |

TABLE 1-continued

| | Production Conditions | | Properties of Barium Ferrite | | | | | | |
|---|---|---|---|---|---|---|---|---|---|
| | Ba/(Fe + Co + Ti) Molar Ratio | Calcining Assistant | σs (emu/g) | iHc (Oe) | Specific Surface Area (m²/g) | Average Particle Size A (μm) | Average Particle Thickness B (μm) | Planarity Ratio (A/B) | Particle Size Distribution (μm) |
| 5 | 1.3/12 | BaCl₂ | 55.0 | 182 | 40.5 | 0.088 | 0.011 | 8.0 | 0.020~0.145 |
| 6 | 1.3/12 | Na₂SO₄ | 50.4 | 772 | 38.5 | 0.080 | 0.012 | 6.7 | 0.030~0.150 |

What is claimed is:

1. A process for producing microcrystalline barium ferrite platelets having the general formula:

$$BaO \cdot n[(Fe_{1-m}M_m)_2O_3]$$

wherein M is at least one substituent element selected from the group consisting of Co, Ti, Ni, Mn, Cu, Zn, In, Ge and Nb, m is 0–0.2, and n is 4–6, which comprises:

forming an aqueous alkaline dispersion containing coprecipitates of hydroxides of barium ions, iron (III) ions, and optionally ions of a substituent element M, in a molar ratio in accordance with the molar ratio described in the general formula of the barium ferrite, and having a pH of not less than about 12;

heating the dispersion to a temperature of 50° C. to 90° C. under atmospheric pressure to convert the coprecipitates to precursors of the barium ferrite;

calcining the precursors to provide microcrystalline barium ferrite platelets;

the improvement comprising the step of adding a carbonating agent selected from the group consisting of water soluble alkali metal carbonates, ammonium carbonate and carbon dioxide gas to the aqueous alkaline dispersion after the heating of the aqueous alkaline dispersion, such carbonating agent being added in amounts such that it is present in the aqueous alkaline dispersion in amounts one hundredth the equivalent of the barium ions to amounts equivalent to that of the barium ions, and the step of calcining the precursors of the barium ferrite in the presence of sodium sulfate at temperatures of 700°–900° C., to provide microcrystalline barium ferrite platelets of about 0.03–0.1 μm in average particle size and 3.3–5.0 in planarity ratio.

2. The process as claimed in claim 1 wherein the precursors are calcined at temperatures of 800°–884° C. in the solid phase of the sodium sulfate.

3. The process as claimed in claim 1 wherein sodium sulfate is used in amounts of not less than 50 parts by weight in relation to 100 parts by weight of the precursors.

4. The process as claimed in claim 1 wherein the dispersion has a pH of not less than 13.

5. The process as claimed in claim 1 wherein the substituent metal is at least one of Co, Ni, Zn and Ti.

6. The process as claimed in claim 1 wherein water soluble silicates are used together with the carbonating agents.

7. The process as claimed in claim 1 in which the planarity ratio is 3.3–4.6.

8. The process as claimed in claim 1 in which the precursors of the barium ferrite correspond to the general formula of the microcrystalline barium ferrite, but which are amorphous as measured by X-ray diffraction.

* * * * *